(12) United States Patent
Kita

(10) Patent No.: US 9,840,291 B2
(45) Date of Patent: Dec. 12, 2017

(54) ROLLER DEVICE FOR TRACK-TYPE WORK VEHICLE, ROLLER SHELL UNIT AND ROLLER SHELL

(71) Applicant: KOMATSU LTD., Tokyo (JP)

(72) Inventor: Naoaki Kita, Hirakata (JP)

(73) Assignee: KOMATSU LTD., Tokyo (JP)

( * ) Notice: Subject to any disclaimer, the term of this patent is extended or adjusted under 35 U.S.C. 154(b) by 623 days.

(21) Appl. No.: 14/363,949

(22) PCT Filed: Jan. 16, 2014

(86) PCT No.: PCT/JP2014/050669
§ 371 (c)(1),
(2) Date: Jun. 9, 2014

(87) PCT Pub. No.: WO2014/112553
PCT Pub. Date: Jul. 24, 2014

(65) Prior Publication Data
US 2016/0236734 A1 Aug. 18, 2016

(30) Foreign Application Priority Data
Jan. 17, 2013 (JP) ................... 2013-006241

(51) Int. Cl.
*B62D 55/14* (2006.01)
*B62D 55/092* (2006.01)
(Continued)

(52) U.S. Cl.
CPC ........... *B62D 55/14* (2013.01); *B62D 55/092* (2013.01); *B62D 55/145* (2013.01); *B62D 55/15* (2013.01); *E02F 3/7609* (2013.01); *B62D 55/088* (2013.01)

(58) Field of Classification Search
CPC ...... B62D 55/14; B62D 55/145; B62D 55/15; B62D 55/088; E02F 3/7609
(Continued)

(56) References Cited

U.S. PATENT DOCUMENTS 2,480,908 A * 9/1949 Davies ................... B62D 55/15
277/403
3,147,048 A 9/1964 Johnson et al.
(Continued)

FOREIGN PATENT DOCUMENTS

CN 102481959 5/2012
GB 1243311 A 8/1971
(Continued)

*Primary Examiner* — S. Joseph Morano
*Assistant Examiner* — Jean Charleston
(74) *Attorney, Agent, or Firm* — Drinker Biddle & Reath LLP

(57) ABSTRACT

A roller device includes a shaft, a bushing, a roller shell, a retainer, and an elastic member. The shaft has a rotation axis. The bushing has smaller-diameter parts on both ends and a larger-diameter part arranged between the smaller-diameter parts with stepped portions interposed therebetween, and is fitted over the outer circumference of the shaft to be rotatable relative to the shaft around the rotation axis. The roller shell has a cylindrical shape, and is fitted over the outer circumference of the smaller-diameter parts of the bushing to abut on the stepped portions. The retainer is formed annularly, is fixed detachably to an end face of the bushing, and abuts on the end face of the roller shell with the elastic member interposed therebetween.

15 Claims, 14 Drawing Sheets

(51) Int. Cl.
  *B62D 55/15* (2006.01)
  *E02F 3/76* (2006.01)
  *B62D 55/088* (2006.01)

(58) Field of Classification Search
  USPC ........ 305/100, 124, 136, 137, 138, 142, 195
  See application file for complete search history.

(56) References Cited

U.S. PATENT DOCUMENTS

| | | | | |
|---|---|---|---|---|
| 3,797,895 | A * | 3/1974 | Tomizawa | B62D 55/0966 152/49 |
| 3,869,931 | A | 3/1975 | Boggs | |
| 3,871,719 | A * | 3/1975 | Boggs | B62D 55/15 305/136 |
| 3,910,128 | A * | 10/1975 | Boggs | B62D 55/15 305/100 |
| 4,085,981 | A | 4/1978 | Takenaka | |
| 4,149,758 | A * | 4/1979 | Livesay | B62D 55/0887 305/100 |
| 5,288,143 | A * | 2/1994 | Dester | B62D 55/145 305/137 |
| 6,474,754 | B1 * | 11/2002 | Hasselbusch | B62D 55/10 305/136 |
| 7,108,337 | B2 * | 9/2006 | Yamamoto | B62D 55/15 305/129 |
| 7,237,853 | B2 * | 7/2007 | Yamamoto | B62D 55/15 305/130 |
| 8,075,068 | B2 * | 12/2011 | VanderVeen | B62D 55/092 305/136 |
| 8,231,184 | B2 * | 7/2012 | Mulligan | B62D 55/15 305/136 |
| 8,366,212 | B2 * | 2/2013 | Maeda | B62D 55/14 305/136 |
| 8,979,219 | B2 * | 3/2015 | Hisamatsu | B62D 55/14 305/100 |
| 2008/0265667 | A1 * | 10/2008 | Livesay | B62D 55/21 305/202 |
| 2011/0121643 | A1 | 5/2011 | Mulligan | |
| 2012/0146397 | A1 | 6/2012 | Hisamatsu | |

FOREIGN PATENT DOCUMENTS

| | | |
|---|---|---|
| JP | S50-6101 Y1 | 2/1975 |
| JP | S50-12834 Y1 | 4/1975 |
| JP | S50-90026 A | 7/1975 |
| JP | S52-15844 B1 | 5/1977 |
| JP | S54-11628 Y2 | 5/1979 |
| JP | 2013-028307 A | 2/2013 |

* cited by examiner

ROLLER DEVICE FOR TRACK-TYPE WORK VEHICLE, ROLLER SHELL UNIT AND ROLLER SHELL

TECHNICAL FIELD

The present invention relates to a roller device for a track-type work vehicle, a roller shell unit and a roller shell.

BACKGROUND ART

Track-type work vehicles, such as bulldozers, have a track type carrier. The track type carrier has a track apparatus, a sprocket wheel, an idler tumbler, a roller device, and the like. The track apparatus is generally structured by coupling a plurality of track links endlessly with pins and bushings and attaching a track shoe plate to the plurality of track links. The track apparatus is wound around the sprocket wheel, the idler tumbler and the roller device, and is configured to be capable of rotationally driving by engaging the teeth of the sprocket wheel with the above-mentioned bushings to rotate the sprocket wheel.

The roller device has a shaft, a bushing, a roller shell, and the like. The shaft is fixed to a work vehicle. The roller shell is rotatably supported by the shaft with the bushing interposed therebetween. The roller shell is worn by rolling over rail surfaces of the track links during traveling. As the wear of the roller shell progresses, the roller shell needs to be replaced. When replacing the roller shell, there is a technique for replacing the whole roller device. However, this technique increases the cost. Therefore, a technique for replacing the roller shell alone rather than the whole roller device has been proposed. This technique for replacing the roller shell alone rather than the whole roller device is disclosed in, for example, Japanese Patent Laying-Open No. 50-90026 (PTD 1).

CITATION LIST

Patent Document

PTD 1: Japanese Patent Laying-Open No. 50-90026

SUMMARY OF INVENTION

Technical Problem

In the roller device described in the above-mentioned publication, the roller shell is press-fitted over the outer circumference of the bushing. Furthermore, the roller shell is fixed to the bushing by a bolt with a retainer plate interposed therebetween. The bushing is rotatably fitted over the shaft, and a lubricant is kept at a rotating part. Here, since the roller shell is fixed to the bushing by the bolt with the retainer plate interposed therebetween, bending stress may act on the bolt because of a load applied to the roller shell from the track links. The bolt is loosened because of this bending stress. Moreover, press-in force of the roller shell decreases because of wear. From these reasons, the roller shell may disadvantageously rotate relative to the bushing to which it should be fixed.

The present invention was made in view of the above problems, and has an object to provide a roller device that can restrain a roller shell from rotating relative to a bushing while the roller shell is replaceable, a roller shell unit, and the roller shell.

Solution to Problem

A roller device for a track-type work vehicle of the present invention includes a shaft, a bushing, a roller shell, an elastic member, and a retainer. The shaft has a rotation axis. The bushing has smaller-diameter parts on both ends and a larger-diameter part arranged between the smaller-diameter parts with stepped portions interposed therebetween, the bushing being fitted over an outer circumference of the shaft to be rotatable relative to the shaft around the rotation axis. The roller shell has a cylindrical shape and is fitted over the outer circumference of the smaller-diameter parts of the bushing to abut on the stepped portions. The retainer is formed annularly, is fixed detachably to an end face of the bushing, and abuts on an end face of the roller shell with the elastic member interposed therebetween.

According to the roller device of the present invention, the roller shell abuts on the stepped portions of the bushing. The retainer is fixed detachably to the end face of the bushing, and abuts on the end face of the roller shell with the elastic member interposed therebetween. Therefore, the roller shell is pressed against the stepped portions of the bushing by the retainer with the elastic member interposed therebetween to be fixed to the bushing. That is, the roller shell and the retainer are not fixed integrally by a bolt or the like. Therefore, a bolt can be prevented from loosening by bending stress acting on the bolt due to a load applied to the roller shell. When the roller shell and the retainer sandwich the elastic member, the elastic member is elastically deformed. As a result, the repulsive force produced by the elastic deformation of the elastic member acts on the roller shell and the retainer. With this repulsive force, the roller shell and the retainer can be fixed securely. Accordingly, the roller shell can be restrained from rotating relative to the bushing while being replaceable.

In the above-described roller device, the roller shell is fitted over the outer circumference of the bushing with a gap left therebetween. Therefore, the roller shell can be easily detached from the bushing.

The above-described roller device further includes an O-ring arranged between the outer circumference of the bushing and an inner circumference of the retainer. Therefore, the O-ring can restrain water from entering in between the roller shell and the bushing.

In the above-described roller device, the elastic member has a plurality of elastic segments separately arranged along a circumferential direction of the bushing. Since the elastic segments can be arranged separately, the elastic member is easy to arrange. Accordingly, the roller shell and the retainer can be easily fixed.

In the above-described roller device, the roller shell includes a tapering part on an inner circumferential side of an end face abutting on the stepped portions. The roller device further includes an O-ring arranged between the tapering part and the bushing. Accordingly, earth and sand or the like can be prevented from entering in between the contact surfaces of the roller shell and the bushing. Therefore, the roller shell can be easily detached from the bushing even after a long-time use of the roller device.

In the above-described roller device, a length of the roller shell on an inner circumference in a direction along the rotation axis is shorter than a length of the smaller-diameter parts of the bushing in the direction along the rotation axis. Accordingly, the elastic member can be arranged radially outside of the bushing, and the retainer fixed to the end face of the bushing with the elastic member interposed therebetween can be easily caused to abut on the roller shell.

In the above-described roller device, the elastic member is formed entirely in a circumferential direction of the bushing. Therefore, the roller shell can be fixed to the retainer by the elastic member over the bushing entirely in the circumferential direction. Accordingly, the roller shell and the retainer can be fixed more securely.

In the above-described roller device, the bushing has a first recess at an outer circumferential surface opposed to the roller shell. The roller shell has a second recess at an inner circumferential surface opposed to the bushing. The roller device further includes an engaging member inserted in both of the first recess and the second recess. With this engaging member being engaged with both of the first recess of the bushing and the second recess of the roller shell, the roller shell is prevented from rotating in the circumferential direction relative to the bushing.

In the above-described roller device, the bushing has a first stepped portion at an outer circumferential surface opposed to the roller shell. The roller shell has a second stepped portion at an inner circumferential surface opposed to the bushing. The first stepped portion and the second stepped portion are opposed to each other in a circumferential direction of the outer circumferential surface. Therefore, when the roller shell is going to rotate in the circumferential direction relative to the bushing, the second stepped portion will be engaged with the first stepped portion. Accordingly, the roller shell is prevented from rotating in the circumferential direction relative to the bushing.

In the above-described roller device, the bushing has a first tooth section constituting the first stepped portion at the outer circumferential surface. The roller shell has a second tooth section constituting the second stepped portion at the inner circumferential surface. The first tooth section is engaged with the second tooth section. With this engagement between the first tooth section and the second tooth section, the roller shell is prevented from rotating in the circumferential direction relative to the bushing.

A roller shell unit for a track-type work vehicle of the present invention is attached to a shaft with a bushing interposed therebetween and is fixable to the bushing by a retainer. The roller shell unit includes a roller shell and an elastic member. The roller shell has a cylindrical shape having a through-hole extending through from one end face to the other end face. The roller shell includes a tapering part provided on the side of the one end face of the through-hole, and includes a bottom surface forming a flat surface orthogonal to the through-hole at a position recessed from the other end face to the one end face side. The elastic member is arranged on the bottom surface of the roller shell.

According to the roller shell unit of the present invention, since there is a tapering part provided on the side of the one end face of the through-hole, the O-ring can be arranged between the tapering part and the bushing. Moreover, since the elastic member is arranged on the bottom surface forming a flat surface orthogonal to the through-hole at a position recessed from the other end face to the one end face side, the roller shell can be fixed to the bushing by the retainer with the elastic member interposed therebetween.

In the above-described roller shell unit, the roller shell has a recess partially in the circumferential direction at a circumferential surface of the through-hole. With the engaging member being engaged with the recess of the roller shell, the roller shell is prevented from rotating in the circumferential direction relative to the bushing.

In the above-described roller shell unit, the roller shell has a tooth section constituting projections and recesses entirely in the circumferential direction at a circumferential surface of the through-hole. With the projections and recesses on the bushing side being engaged with the tooth section of the roller shell, the roller shell is prevented from rotating in the circumferential direction relative to the bushing.

A roller shell for a track-type work vehicle of the present invention is attached to a shaft with a bushing interposed therebetween and is fixable to the bushing by a retainer. The roller shell has a cylindrical shape having a through-hole extending through from one end face to the other end face. The roller shell includes a tapering part provided on the side of the one end face of the through-hole, and includes a bottom surface forming a flat surface orthogonal to the through-hole at a position recessed from the other end face to the one end face side.

Since the roller shell of the present invention includes a tapering part provided on the side of the one end face of the through-hole, the O-ring can be arranged between the tapering part and the bushing. Moreover, by providing an elastic member on the bottom surface forming a flat surface orthogonal to the through-hole at a position recessed from the other end face to the one end face side, the roller shell can be fixed to the bushing by the retainer with the elastic member interposed therebetween.

In the above-described roller shell, the roller shell has a recess partially in the circumferential direction at a circumferential surface of the through-hole. With the engaging member being engaged with the recess of the roller shell, the roller shell is prevented from rotating in the circumferential direction relative to the bushing.

In the above-described roller shell, the roller shell has a tooth section constituting projections and recesses entirely in the circumferential direction at a circumferential surface of the through-hole. With the projections and recesses on the bushing side being engaged with the tooth section of the roller shell, the roller shell is prevented from rotating in the circumferential direction relative to the bushing.

Advantageous Effects of Invention

As describe above, according to the present invention, the roller shell can be restrained from rotating relative to the bushing while being replaceable.

DESCRIPTION OF EMBODIMENTS

Hereinafter, embodiments of the present invention will be described based on the drawings.

First Embodiment

First, a configuration of a bulldozer according to a first embodiment of the present invention will be described with reference to FIGS. 1 and 2. Although the bulldozer as an example of a track-type work vehicle to which the idea of the present invention is applicable will be described below, the present invention is also applicable to a track-type work vehicle such as a hydraulic excavator.

Figure 1:
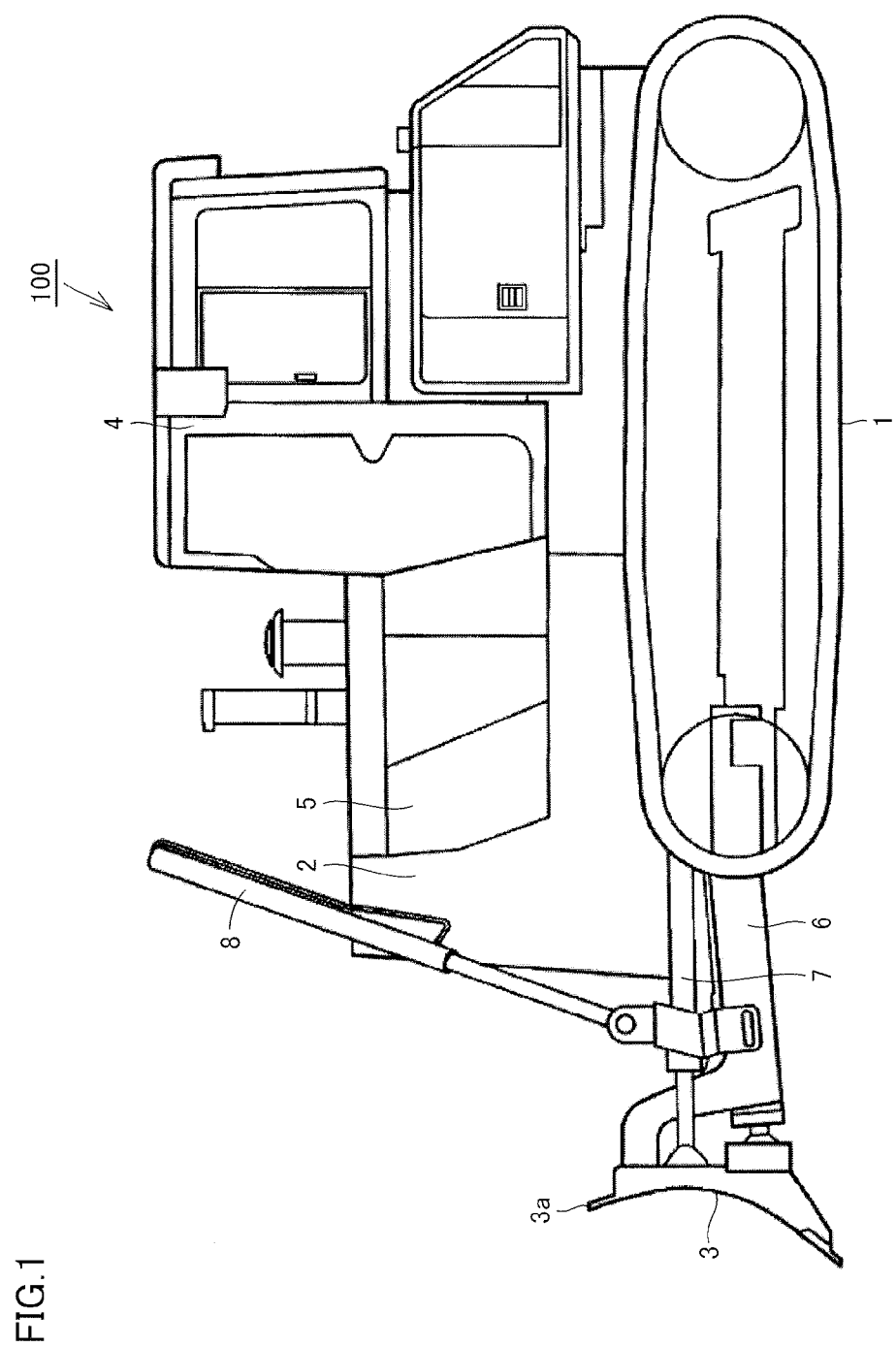
FIG. 1 is a schematic side view showing a configuration of a bulldozer as an example of a track-type work vehicle according to a first embodiment of the present invention.

FIG. 1 is a schematic side view showing a configuration of the bulldozer as an example of a track-type work vehicle according to the first embodiment of the present invention. FIG. 2 is a side view schematically showing a configuration of a track type carrier in the track-type work vehicle in FIG. 1.

Referring to FIG. 1, a bulldozer 100 of the present embodiment mainly includes a matched pair of traveling apparatuses including track type carriers 1 and separated from each other in the width direction, a body 2 disposed between the matched pair of traveling apparatuses, and a blade 3 disposed in front of body 2. Body 2 has a cab (operator's cab) 4 and an engine compartment 5. Cab 4 occupies the upper backside portion of body 2, and engine compartment 5 is disposed in front of cab 4.

Blade 3 has left and right sides supported by frames 6, and is provided to be operated by angle cylinders 7 and lift cylinders 8. An upper end 3a of blade 3 indicates the upper part of the left or right end of blade 3. Frame 6 has one end attached to the backside surface of blade 3 by a rotatable support, and has the other end pivotably supported by a side surface of body 2. Each of angle cylinders 7 has one end pivotably supported by the backside surface of blade 3, and has the other end pivotably supported by the side surface of body 2. This angle cylinder 7 is extended and contracted by hydraulic pressure to move upper end 3a in the front/back direction (leftward/rightward in FIG. 1) relative to a support formed by frame 6 of blade 3, thereby performing angling control of a posture of blade 3 in the front/back direction. Each of lift cylinders 8 has one end pivotably supported by the upper surface of frame 6, and has an intermediate portion pivotably supported by a side surface of body 2. This lift cylinder 8 is extended or contracted by hydraulic pressure to move blade 3 in the upward/downward direction relative to the other end of frame 6.

Figure 2:
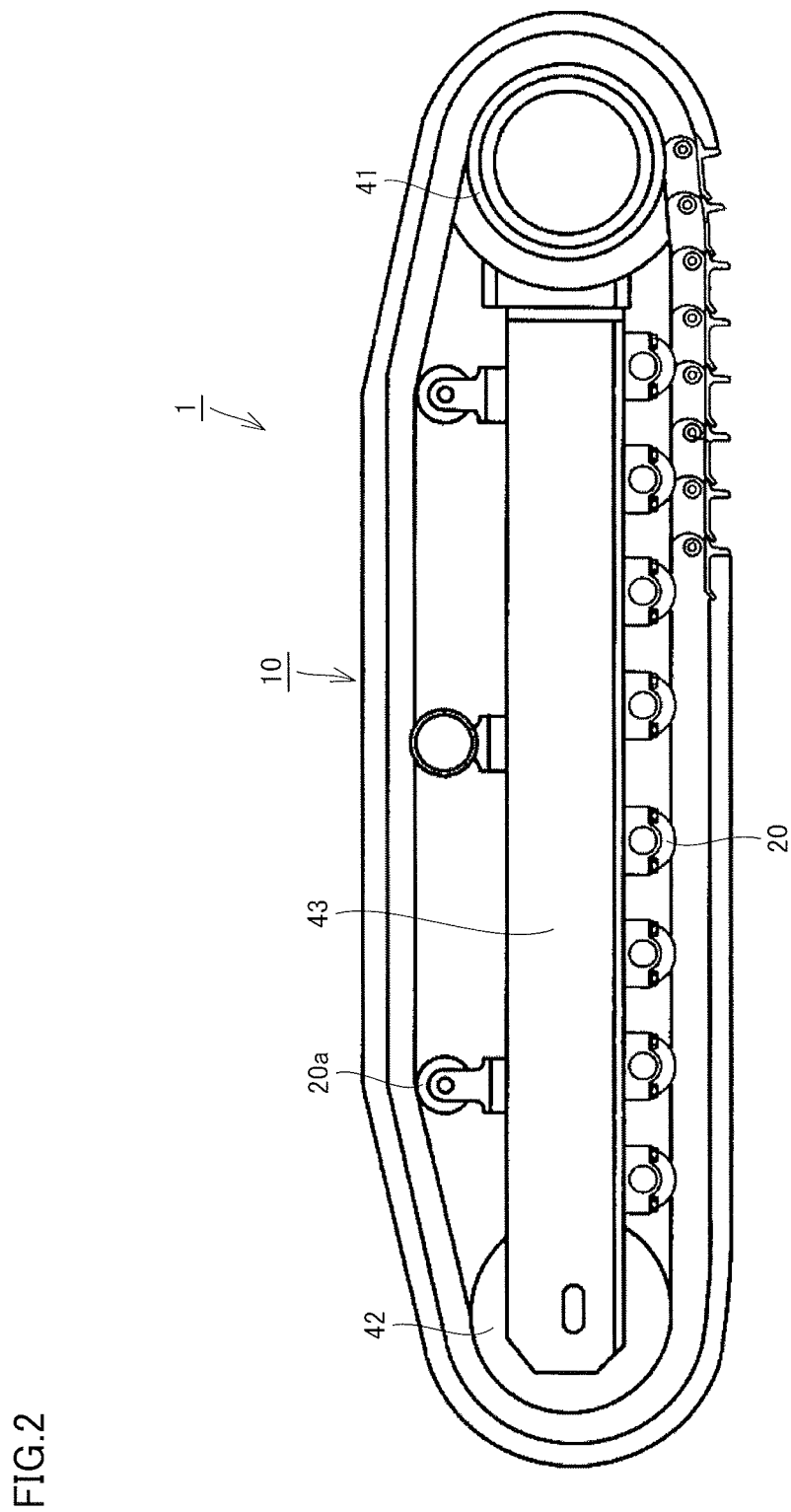
FIG. 2 is a side view schematically showing a configuration of a track type carrier in the track-type work vehicle in FIG. 1.

Referring to FIG. 2, track type carrier 1 mainly includes a track apparatus 10, a roller device (track roller) 20, a carrier roller 20a, a driving wheel (sprocket wheel) 41, an idler wheel (idler tumbler) 42, and a track frame 43.

Body 2 is provided on each side thereof with driving wheel 41 and track frame 43. Track frame 43 is provided on each side thereof with idler wheel 42, a plurality of lower roller devices (track rollers) 20, and a plurality of upper roller devices (carrier rollers) 20a. Driving wheel 41 is provided on the rear side of track frame 43 such that it can be driven to rotate. Idler wheel 42 is rotatably provided, for example, at the front end of track frame 43. The plurality of roller devices (track rollers) 20 are rotatably provided on the lower surface side of track frame 43. The plurality of carrier rollers 20a are rotatably provided on the upper surface side of track frame 43.

Track apparatus 10 is configured in an endless manner (in an oval shape), and wound around driving wheel 41 and idler wheel 42. Furthermore, track apparatus 10 is supported by the plurality of roller devices (track rollers) 20 and the plurality of carrier rollers 20a that are arranged between driving wheel 41 and idler wheel 42.

Track apparatus 10 is engaged with driving wheel 41, and configured such that it can be driven to rotate by driving rotation of this driving wheel 41. During driving rotation of track apparatus 10, each of idler wheel 42, the plurality of roller devices (track rollers) 20 and the plurality of carrier rollers 20a can be driven to rotate while coming into contact with track apparatus 10.

Next, a configuration of track apparatus 10 and roller device 20 used for the above-described bulldozer will be described with reference to FIGS. 3 to 5.

Figure 3:
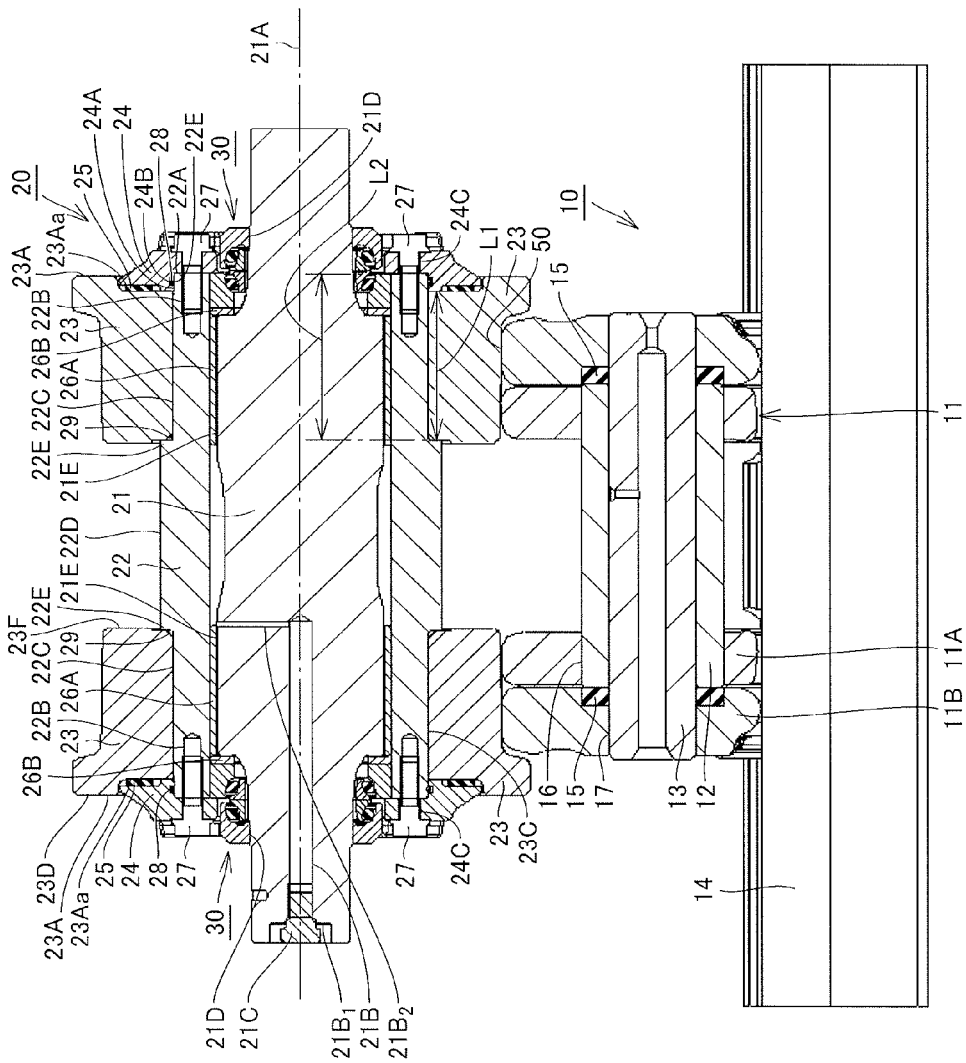
FIG. 3 is a cross-sectional view schematically showing a state in which a roller device abuts on a track apparatus included in the track type carrier in FIG. 2.

FIG. 3 is a cross-sectional view schematically showing a state in which the roller device abuts on the track apparatus included in the track type carrier in FIG. 2. FIGS. 4 and 5 are a partial exploded perspective cross-sectional view and a partial exploded perspective view each schematically showing a configuration of the roller device in FIG. 3.

Referring to FIG. 3, track apparatus 10 described above mainly includes a track link 11, a bushing 12, a coupling pin 13, a track shoe plate (shoe plate) 14, and a seal member 15. Track apparatus 10 is configured in an oval shape by coupling, in an endless manner, a plurality of track links 11 having track shoe plate 14 attached thereto.

In one track apparatus 10, a plurality of track links 11 are arranged in two rows. One track link 11 and the other track link 11 located adjacent to each other in the same row are arranged so as to allow communication between bushing hole 16 of one track link 11 and pin hole 17 of the other track link 11.

Cylindrical bushing 12 is pressed-fitted into bushing hole 16 of one track link 11. Coupling pin 13 is inserted into bushing 12, and press-fitted into pin hole 17 of the other track link 11. Seal member 15 is inserted into a larger-diameter part of pin hole 17 of the other track link 11. One track link 11 and the other track link 11 arranged in the row direction in this way are coupled to each other.

Furthermore, track link 11 in the first row is placed on one end side of one bushing 12 and coupling pin 13 as described above while track link 11 in the second row is placed on the other end side thereof, so that track links 11 in one row and the other row are coupled to each other. In this state, one end 11A of one track link 11 is placed on the inner side of the two rows of track links 11, and the other end 11B of the other track link 11 is placed on the outer side of the two rows of track links 11.

In this way, track links 11 in each row are coupled to each other. With the first row of track links 11 disposed on the one end side of one bushing 12 and coupling pin 13 and the second row of track links 11 disposed on the other end side, plurality of track links 11 constituting the two rows are coupled to each other.

Roller device (track roller) 20 described above is placed to be capable of rolling with roller shell 23 abutting on rail surfaces 50 of track links 11. Hereinafter, a configuration of roller device (track roller) 20 will be described in detail with reference to FIGS. 3 and 4.

Figure 4:
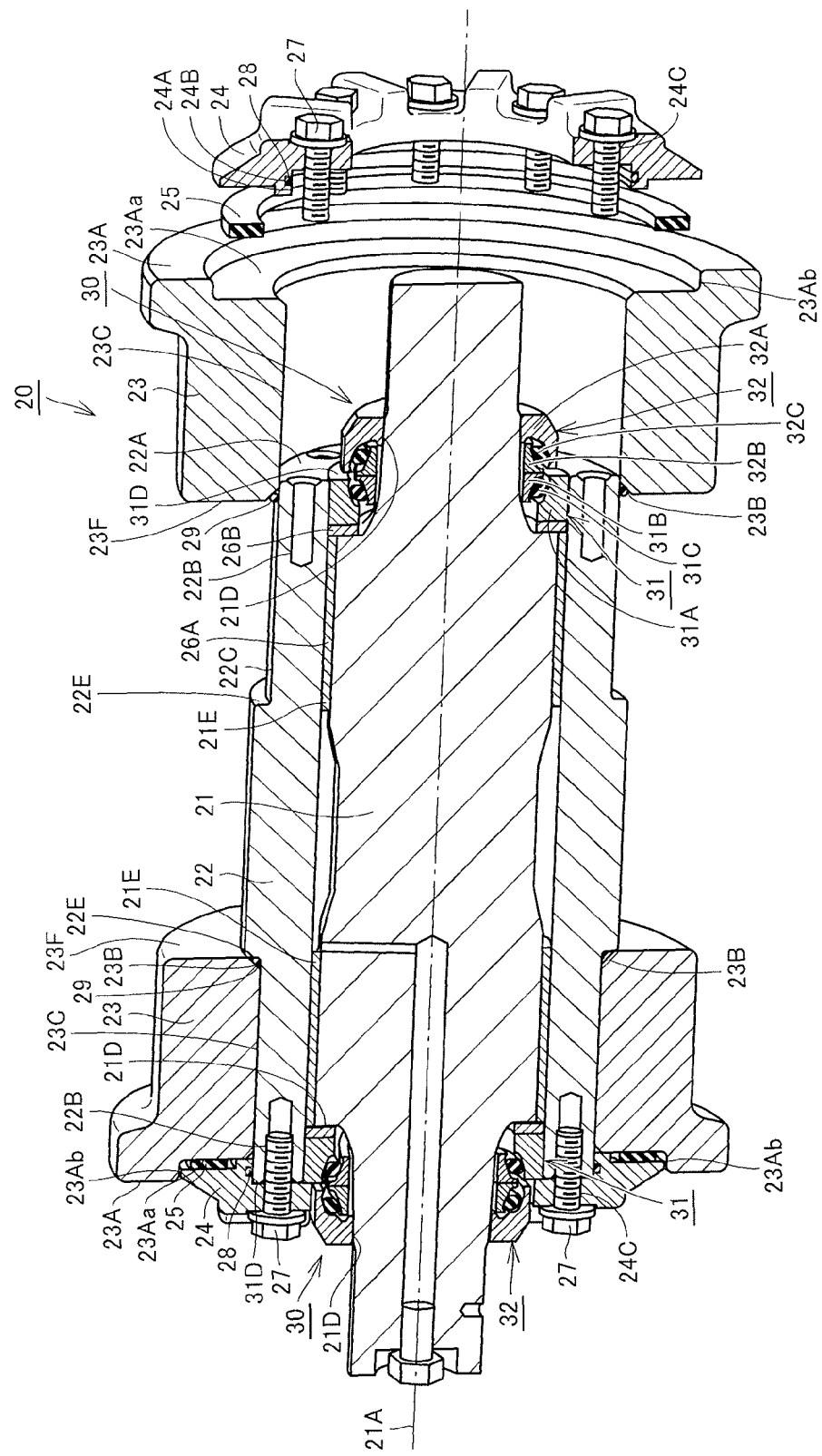
FIG. 4 is a partial exploded perspective cross-sectional view schematically showing a configuration of the roller device in FIG. 3.

Referring to FIGS. 3 and 4, roller device (track roller) 20 has a shaft 21, a bushing 22, roller shell 23, a retainer 24, an elastic member 25, a bearing 26A, a thrust bearing 26B, a fixing member (bolt) 27, O-rings 28, 29, and a seal 30.

Shaft 21 has rotation axis 21A. Rotation axis 21A extends through the center of shaft 21. Bushing 22 and roller shell 23 rotate around shaft 21 with rotation axis 21A serving as the center of rotation. Shaft 21 has a supply channel 21B for supplying a lubricating oil in between shaft 21 and bushing 22. Supply channel 21B is formed along rotation axis 21A, and has an opening $21B_1$ on one end face of shaft 21. Supply channel 21B also has a through-hole $21B_2$ communicating with the outer circumferential surface of shaft 21. Accordingly, the lubricating oil injected through opening $21B_1$ is supplied from supply channel 21B to a gap between shaft 21 and bushing 22 through through-hole $21B_2$.

Shaft 21 further has a plug member 21C which is mountable to opening $21B_1$ of supply channel 21B. After the lubricating oil is injected to supply channel 21B through opening $21B_1$, plug member 21C is mounted on opening $21B_1$. Shaft 21 also has a shaft smaller-diameter part 21D arranged on the both ends and a shaft larger-diameter part 21E arranged closer to the central side than shaft smaller-diameter part 21D. Shaft larger-diameter part 21E has, on its both ends, annular flat outer circumferential surfaces in a plane orthogonal to rotation axis 21A, and shaft smaller-diameter parts 21D are provided via the outer circumferential surfaces. Shaft larger-diameter part 21E is cylindrical on the both ends in the axial direction, and between the cylindrical sections, has a section having a diameter smaller than that of the cylindrical sections.

Bushing 22 is fitted over the outer circumference of shaft 21 so as to be capable of rotating relative to shaft 21 around rotation axis 21A. Bearing 26A is arranged between the inner circumference of bushing 22 and the outer circumference of shaft 21. Bushing 22 has a plurality of attachment holes 22B formed in end face 22A. Bushing 22 also has bushing smaller-diameter parts 22C arranged on the both ends and a bushing larger-diameter part 22D arranged closer to the central side than bushing smaller-diameter parts 22C. A stepped portion 22E is formed at the outer circumferential surface of bushing 22 between bushing smaller-diameter parts 22C and bushing larger-diameter part 22D.

Stepped portion 22E is a portion connecting bushing larger-diameter part 22D and bushing inner-diameter parts 22C having different dimensions in the radial direction around rotation axis 21A and is a portion constituting a step causing the dimensional difference in the radial direction between bushing larger-diameter part 22D and bushing inner-diameter parts 22C. An inner circumferential end of this stepped portion 22E is connected to bushing smaller-diameter parts 22C, and an outer circumferential end of stepped portion 22E is connected to bushing larger-diameter part 22D. Stepped portion 22E has a surface crossing the direction of rotation axis 21A, and has an annular flat surface orthogonal to rotation axis 21A, for example. Alternatively, the surface of stepped portion 22E may not be orthogonal to rotation axis 21A, but may be a surface inclined with respect to an imaginary plane orthogonal to rotation axis 21A (e.g., a side circumferential surface of a truncated cone). In this case, stepped portion 22E has a tapered shape such that its radial dimension around rotation axis 21A gradually decreases from the outer circumferential end serving as the connection with bushing larger-diameter part 22D to the inner circumferential end serving as the connection with bushing inner-diameter part 22C. Stepped portion 22E supports roller shell 23 in the direction of rotation axis 21A.

Roller shell 23 is configured to be replaceable. Roller shell 23 has a cylindrical shape having a through-hole 23C extending through from one end face 23F to other end face 23A. Roller shell 23 is fitted over the outer circumference of bushing 22. Specifically, two roller shells 23 are fitted over two bushing smaller-diameter parts 22C, respectively, with gaps left therebetween. That is, roller shell 23 is attached to the outer circumferential surface of bushing 22 so as to be detachable without any special tool. An axial length L1 of roller shell 23 on the inner circumference is shorter than an axial length L2 of bushing smaller-diameter parts 22C. One end face 23F of roller shell 23 abuts on stepped portion 22E with roller shell 23 being attached to bushing 22.

Roller shell 23 has a tapering part 23B (FIG. 4) provided on the one end face 23F side of through-hole 23C. Tapering part 23B is a ring-shaped surface positioned on the inner circumferential side of one end face 23F of roller shell 23 and formed with an angle of 45° with one end face 23F. An O-ring 29 which will be described later is arranged to abut on each of tapering part 23B, stepped portion 22E and smaller-diameter part 22C of bushing 22.

Roller shell 23 has a bottom surface 23Aa forming a flat surface orthogonal to through-hole 23C at a position recessed from other end face 23A to the one end face 23F side. Bottom surface 23Aa is a flat surface orthogonal to rotation axis 21A. The outer diameter of bottom surface 23Aa is smaller than the outer diameter of other end face 23A of roller shell 23, and the inner diameter of bottom surface 23Aa is equal to the inner diameter of roller shell 23. Focusing attention to roller shell 23 alone, roller shell 23 includes an annular flange (projecting part) 23D protruding to the outer circumferential side of other end face 23A, and includes bottom surface 23Aa on the inner circumferential side of flange 23D. Roller shell 23 is pressed by retainer 24 at bottom surface 23Aa. Since bottom surface 23Aa is a surface orthogonal to through-hole 23C, pressing force acts thereon effectively. In the state where roller shell 23 alone is fitted over bushing 22, roller shell 23 is freely movable with respect to bushing smaller-diameter parts 22C circumferentially and axially.

Retainer 24 is fixed to bushing 22 to prevent roller shell 23 from being detached from bushing 22 and allows roller shell 23 to be pressed against bushing 22 in the direction of rotation axis 21A. Retainer 24 has an annular shape. The inner diameter of the annular shape of retainer 24 is larger than the outer diameter of shaft smaller-diameter part 21D of shaft 21. Therefore, retainer 24 can be fitted over shaft smaller-diameter part 21D so as to leave a gap between retainer 24 and the outer circumferential surface of shaft smaller-diameter part 21D.

Retainer 24 is configured to face the whole end face 22A of bushing 22 and bottom surface 23Aa of roller shell 23 in the state where retainer 24 is fitted over shaft smaller-diameter part 21D. Specifically, the outer diameter of the annular shape of retainer 24 has a dimension larger than the outer diameter of end face 22A of bushing 22 and smaller than or equal to the outer diameter of bottom surface 23Aa of roller shell 23. Moreover, a plurality of insertion holes 24C for insertion of bolts are formed along the circumferential direction in a portion of retainer 24 opposed to attachment hole 22B of bushing 22.

Retainer 24 is fixed to bushing 22 by screwing fixing member 27 (e.g., a bolt) into attachment hole 22B through this insertion hole 24C. In the state where retainer 24 is fixed to bushing 22, a gap is left in the direction of rotation axis 21A between retainer 24 and bottom surface 23Aa of roller shell 23. The outer circumferential surface of the annular shape of retainer 24 preferably abuts on an outer circumferential wall surface 23Ab formed between bottom surface 23A and other end face 23Aa of roller shell 23.

Elastic member 25 is fitted within the gap between retainer 24 and bottom surface 23Aa of roller shell 23. To fit elastic member 25 within the above-described gap, the outer diameter of the annular shape of elastic member 25 has a dimension smaller than or equal to the outer diameter of bottom surface 23Aa of roller shell 23.

In the state where retainer 24 is fixed to bushing 22 by fixing member 27, elastic member 25 is elastically deformed and abuts on both of roller shell 23 and retainer 24. Accordingly, elastic member 25 presses roller shell 23 against stepped portion 22E of bushing 22 in the direction of rotation axis 21A. Accordingly, roller shell 23 is fixed to bushing 22.

It is noted that, in the state where elastic member 25 has been elastically deformed as described above, the thickness of elastic member 25 is a dimension smaller than the depth of roller shell 23 from other end face 23A to bottom surface 23Aa. This allows the outer circumferential edge of the annular shape of retainer 24 to abut on the outer circumferential wall surface of roller shell 23.

Elastic member 25 is more likely to be elastically deformed than roller shell 23 and retainer 24. Elastic member 25 has a coefficient of friction higher than those of roller shell 23 and retainer 24. Elastic member 25 is formed from rubber, for example. As the rubber, NR (natural rubber), CR (chloroprene rubber), NBR (acrylonitrile-butadiene rubber), EPT (ethylene-propylene rubber), IIR (isobutylene-isoprene rubber), CSM (chlorosulfonated polyethylene rubber), SBR (styrene-butadiene rubber), BR (butadiene rubber), SR (silicone rubber), FR (fluororubber), UR (urethane rubber), or the like can be used.

Since axial length L1 on the inner circumference of roller shell 23 is shorter than axial length L2 on the outer circumference of bushing smaller-diameter part 22C, the outer circumferential surface of bushing 22 is arranged on the inner circumferential side of bottom surface 23Aa.

Referring to FIGS. 3 and 4, elastic member 25 is arranged on bottom surface 23Aa, and is provided over the outer circumferential surface of bushing 22 entirely in the circumferential direction. That is, elastic member 25 is formed annularly. Elastic member 25 is formed to have a uniform thickness. Retainer 24 is formed annularly so as to cover elastic member 25.

Bearing 26A is fitted over the outer circumferential surface of shaft 21. Specifically, bearing 26A is arranged between the outer circumferential surface of shaft larger-diameter part 21E and the inner circumferential surface of bushing 22. Thrust bearing 26B is arranged at an end face between shaft smaller-diameter part 21D and shaft larger-diameter part 21E.

Retainer 24 is fixed to bushing 22 by plurality of fixing members (bolts) 27 with elastic member 25 interposed between retainer 24 and roller shell 23. Fixing member (bolt) 27 is attached to attachment hole 22B of bushing 22 through insertion hole 24C of retainer 24.

O-ring 28 is arranged between the outer circumferential surface of bushing 22 and an inner circumferential surface 24A of retainer 24. Specifically, O-ring 28 is arranged in a groove 24B formed in inner circumferential surface 24A of retainer 24. O-ring 29 is arranged between stepped portion 22E and tapering part 23B provided on the inner circumferential side of one end face 23F of roller shell 23. With this arrangement, earth and sand or the like are prevented from intruding on a fitting surface between bushing 22 and roller shell 23 from stepped portion 22E. Therefore, removal of roller shell 23 from bushing 22 after a long-time use of the roller device becomes easy.

Figure 5:
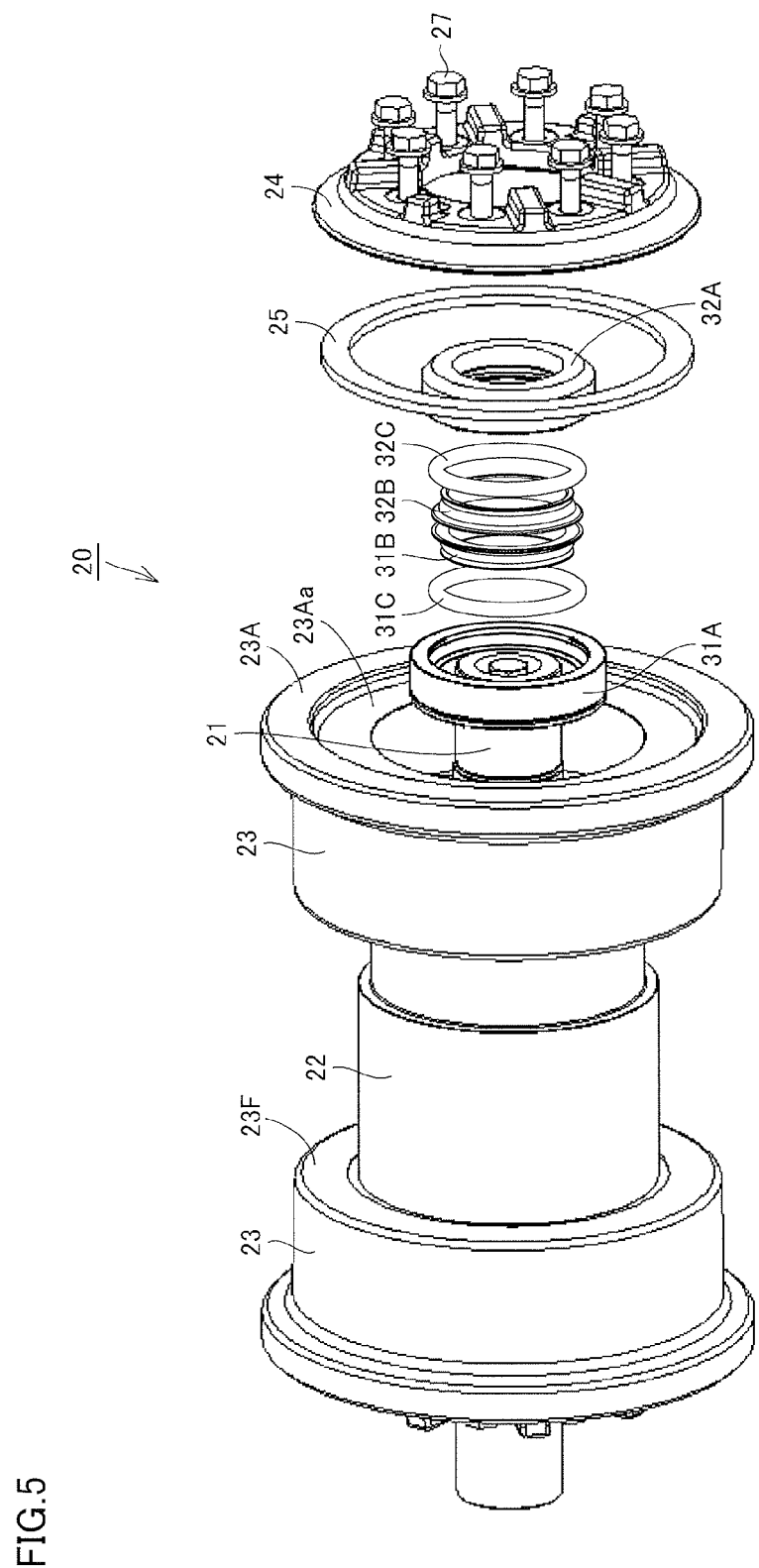
FIG. 5 is a partial exploded perspective view schematically showing a configuration of the roller device in FIG. 4.

Referring to FIGS. 4 and 5, seal 30 is arranged on the inner circumferential side of each of bushing 22 and retainer 24. Seal 30 is a floating seal. Seal 30 has a first seal member 31 on the rotating side and a second seal member 32 on the fixed side. First seal member 31 is configured to be rotatable relative to second seal member 32.

First seal member 31 has a first housing 31A, a first floating seal 31B, and a first elastic ring 31C. First housing 31A is an annular member, and is fixed with its outer circumference fitted on the inner circumference of bushing 22. First floating seal 31B is supported on the inner circumference of first housing 31A with first elastic ring 31C interposed therebetween. Retainer 24 abuts on an end face 31D of first seal member 31.

Second seal member 32 has a second housing 32A, a second floating seal 32B, and a second elastic ring 32C. Second housing 32A is an annular member, and is fixed with its inner circumference fitted over the outer circumference of shaft 21. Second floating seal 32B is supported on the inner circumference of second housing 32A with second elastic ring 32C interposed therebetween.

First floating seal 31B and second floating seal 32B abut on each other by elastic force of first elastic ring 31C and second elastic ring 32C to be kept in a sealed condition. When first housing 31A on the rotating side is rotated, first floating seal 31B and second floating seal 32B slide in the sealed condition. Accordingly, leakage of the lubricating oil can be prevented.

In roller device 20 of the present embodiment, roller shell 23 is simply freely fitted over bushing 22. Therefore, after removing retainer 24 from bushing 22 by unscrewing plurality of fixing members (bolts) 27, roller shell 23 can be detached from bushing 22 by detaching roller shell 23 from bushing 22.

Figure 6:
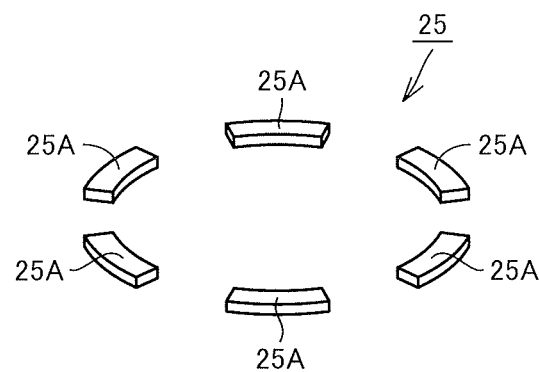
FIG. 6 is a perspective view schematically showing a plurality of elastic segments according to the first embodiment of the present invention.

Although the foregoing has described the case in which elastic member 25 is formed over bushing 22 entirely in the circumferential direction, this is not a limitation, but elastic member 25 may be composed of a plurality of members. Referring to FIG. 6, elastic member 25 may have a plurality of elastic segments 25A. Plurality of elastic segments 25A are separately arranged along the circumferential direction of bushing 22.

Next, a configuration of a roller shell unit 23U of the present embodiment will be described with reference to FIGS. 5 and 7.

Figure 7:
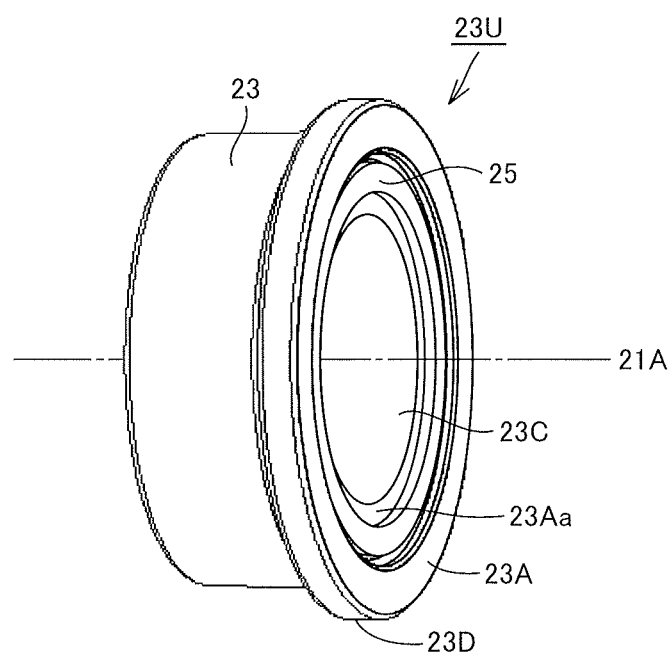
FIG. 7 is a schematic perspective view showing a configuration of a roller shell unit according to the first embodiment of the present invention.

FIG. 7 is a schematic perspective view showing a configuration of a roller shell unit according to the first embodiment of the present invention. Referring to FIGS. 5 and 7, roller shell unit 23U is attached to shaft 21 with bushing 22 interposed therebetween, and is fixable to bushing 22 by retainer 24. Roller shell unit 23U has roller shell 23 fitted over the outer circumference of bushing 22 by loose fitting, and elastic member 25.

Next, functions and effects of the present embodiment will be described.

According to roller device 20 of the present embodiment, roller shell 23 abuts on stepped portion 22E of bushing 22, and retainer 24 is detachably fixed to end face 22A of bushing 22 and abuts on an end face (bottom surface 23Aa) of roller shell 23 with elastic member 25 interposed therebetween. Therefore, roller shell 23 is fixed to bushing 22 by being pressed against stepped portion 22E of bushing 22 by retainer 24 with elastic member 25 interposed therebetween. That is, roller shell 23 and retainer 24 are not integrally fixed by bolts or the like. This can prevent the bolts from loosening by the action of bending stress on the bolts due to a load applied to roller shell 23. When roller shell 23 and retainer 24 sandwich elastic member 25, elastic member 25 is elastically deformed. As a result, repulsive force caused by the elastic deformation of elastic member 25 acts on roller shell 23 and retainer 24. With this repulsive force, roller shell 23 and retainer 24 can be fixed securely. Accordingly, roller shell 23 can be restrained from rotating relative to bushing 22 while being replaceable. If roller shell 23 is fixed to bushing 22 by fitting roller shell 23 over the outer circumferential surface of bushing 22 (as described in PTD 1), initial press-in power cannot be maintained as roller shell 23 is worn. Therefore, roller shell 23 may rotate relative to bushing 22 after a long-time use. When roller shell 23 rotates, the lubricating oil will not be supplied to the interface between roller shell 23 and bushing 22. Therefore, water and the like will be supplied from the environment to cause rusting and reduce the life of roller device 20. According to roller device 20 of the present embodiment, fixing of roller shell 23 to bushing 22 is achieved by pressing from elastic member 25. Therefore, the roller device is not affected by wear of roller shell 23.

Moreover, according to roller device 20 of the present embodiment, roller shell 23 can be easily removed from bushing 22 since roller shell 23 is fitted over bushing 22 by loose fitting.

Moreover, according to roller device 20 of the present embodiment, O-ring 28 provided between the outer circumferential surface of bushing 22 and inner circumferential surface 24A of retainer 24 can restrain water from intruding in between roller shell 23 and bushing 22.

Moreover, according to roller device 20 of the present embodiment, elastic member 25 has plurality of elastic segments 25A separately arranged along the circumferential direction of bushing 22. Since elastic segment 25A can be arranged separately, elastic member 25 is easy to arrange. Accordingly, roller shell 23 and retainer 24 can be easily fixed.

Moreover, according to roller device 20 of the present embodiment, O-ring 29 arranged between tapering part 23B and bushing 22 prevents earth and sand or the like from intruding on the contact surface between roller shell 23 and bushing 22. Therefore, roller shell 23 can be easily detached from bushing 22 even after a long-time use of the roller device.

Moreover, according to roller device 20 of the present embodiment, length L1 of roller shell 23 on the inner circumference along the rotation axis is shorter than length L2 of smaller-diameter part 22C of bushing 22 along the rotation axis. Accordingly, elastic member 25 can be arranged on the radially outside of bushing 22, and retainer 24 fixed to end face 22A of bushing 22 can be easily caused to abut on roller shell 23 with elastic member 25 interposed therebetween.

Moreover, according to roller device 20 of the present embodiment, elastic member 25 is formed over bushing 22 entirely in the circumferential direction. Therefore, roller shell 23 can be fixed to retainer 24 by elastic member 25 over bushing 22 entirely in the circumferential direction. Accordingly, roller shell 23 and retainer 24 can be fixed more securely.

Since roller shell unit 23U of the present embodiment has tapering part 23B provided on the one end face 23F side of through-hole 23C, O-ring 29 can be arranged between tapering part 23B and bushing 22. Furthermore, since elastic member 25 is arranged on bottom surface 23Aa forming a flat surface orthogonal to through-hole 23C at a position recessed from other end face 23A to the one end face 23F side, roller shell 23 can be fixed to bushing 22 by retainer 24 with elastic member 25 interposed therebetween.

According to roller shell 23 of the present embodiment, since there is tapering part 23B provided on the one end face 23F side of through-hole 23C, O-ring 29 can be arranged between tapering part 23B and bushing 22. Moreover, by providing elastic member 25 on bottom surface 23Aa forming a flat surface orthogonal to through-hole 23C at a position recessed from other end face 23A to the one end face 23F side, roller shell 23 can be fixed to bushing 22 by retainer 24 with elastic member 25 interposed therebetween.

Second Embodiment

Figure 8:
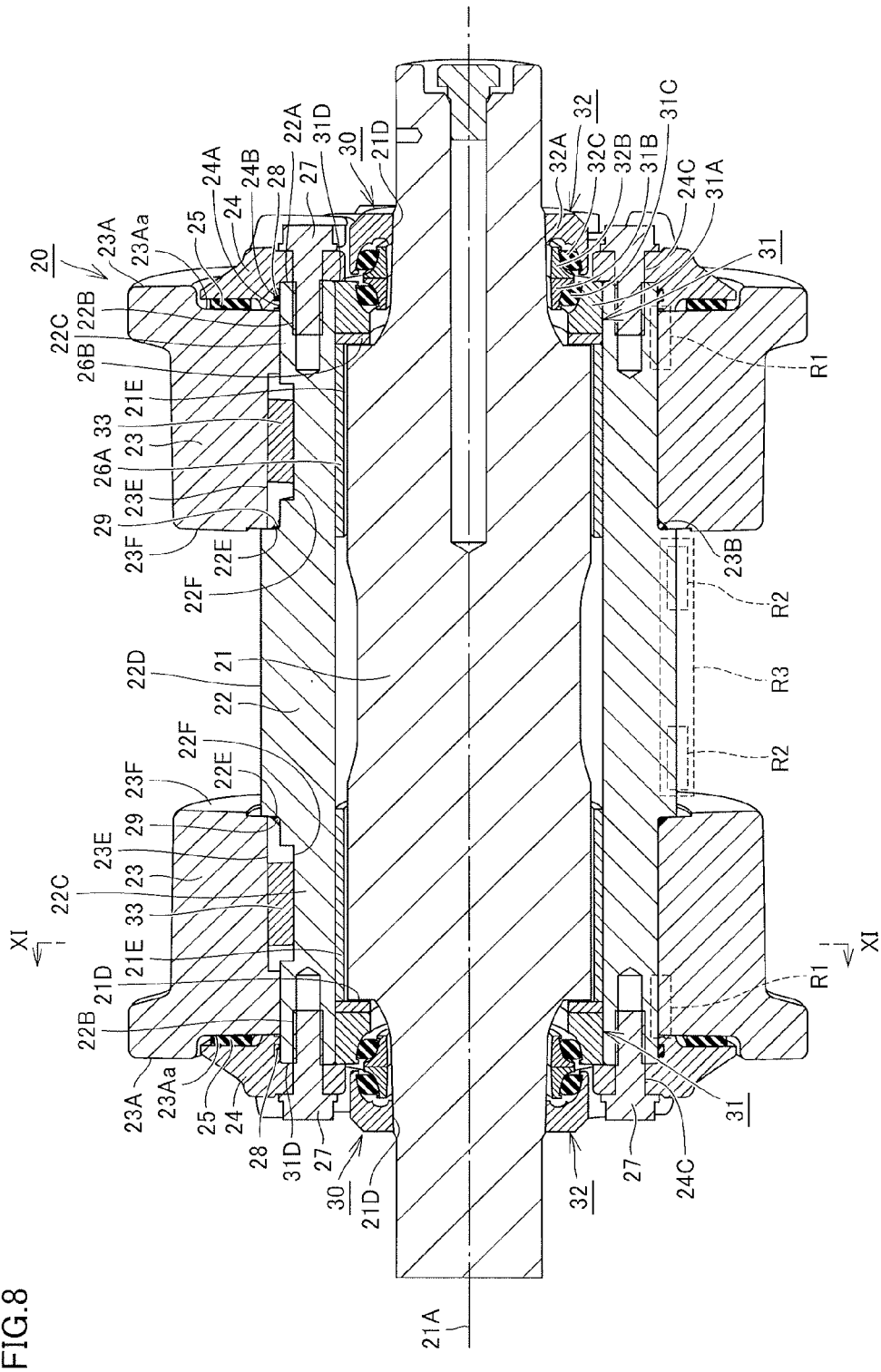
FIG. 8 is a cross-sectional perspective view schematically showing a configuration of a roller device according to a second embodiment of the present invention.
Figure 9:
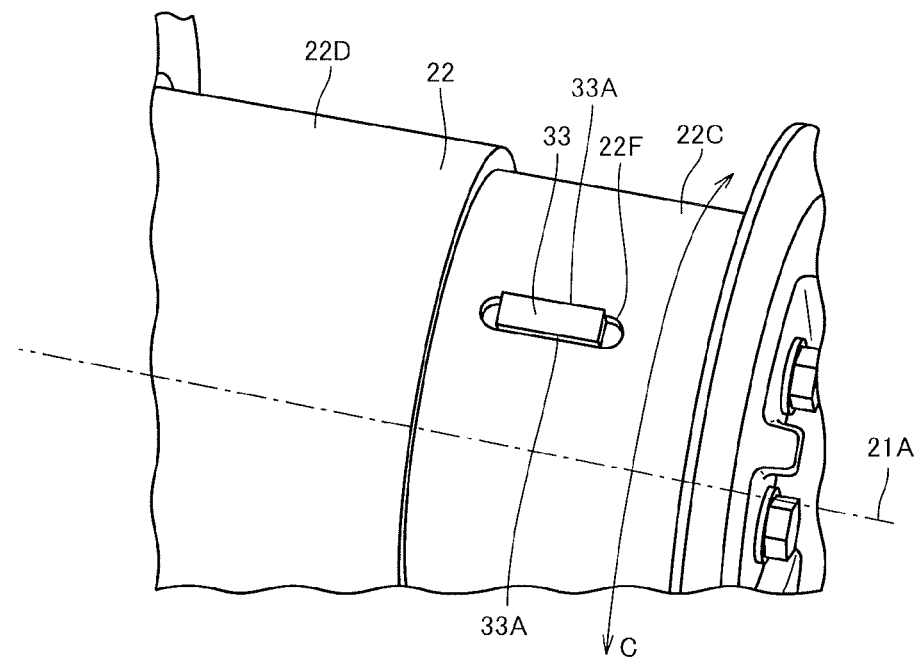
FIG. 9 is an enlarged perspective view showing the neighborhood of a key attachment part of a bushing in the roller device shown in FIG. 8.
Figure 10:
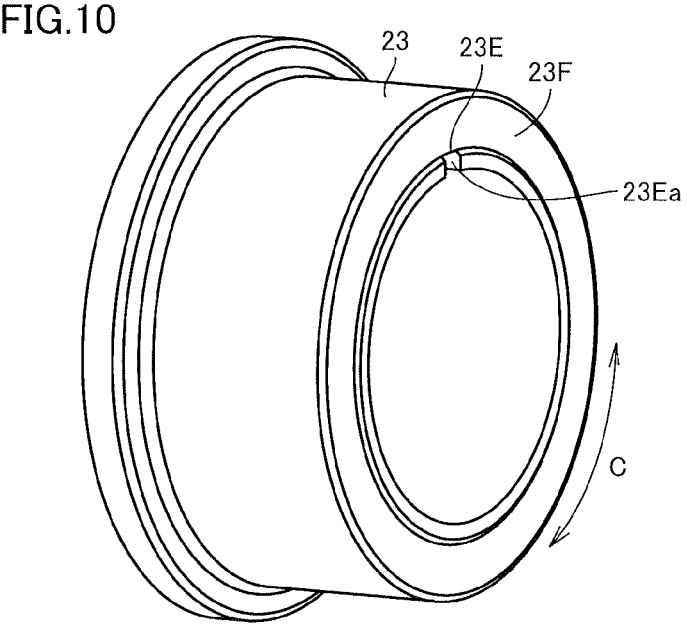
FIG. 10 is a schematic perspective view showing a configuration of a roller shell used for the roller device shown in FIG. 8.
Figure 11:
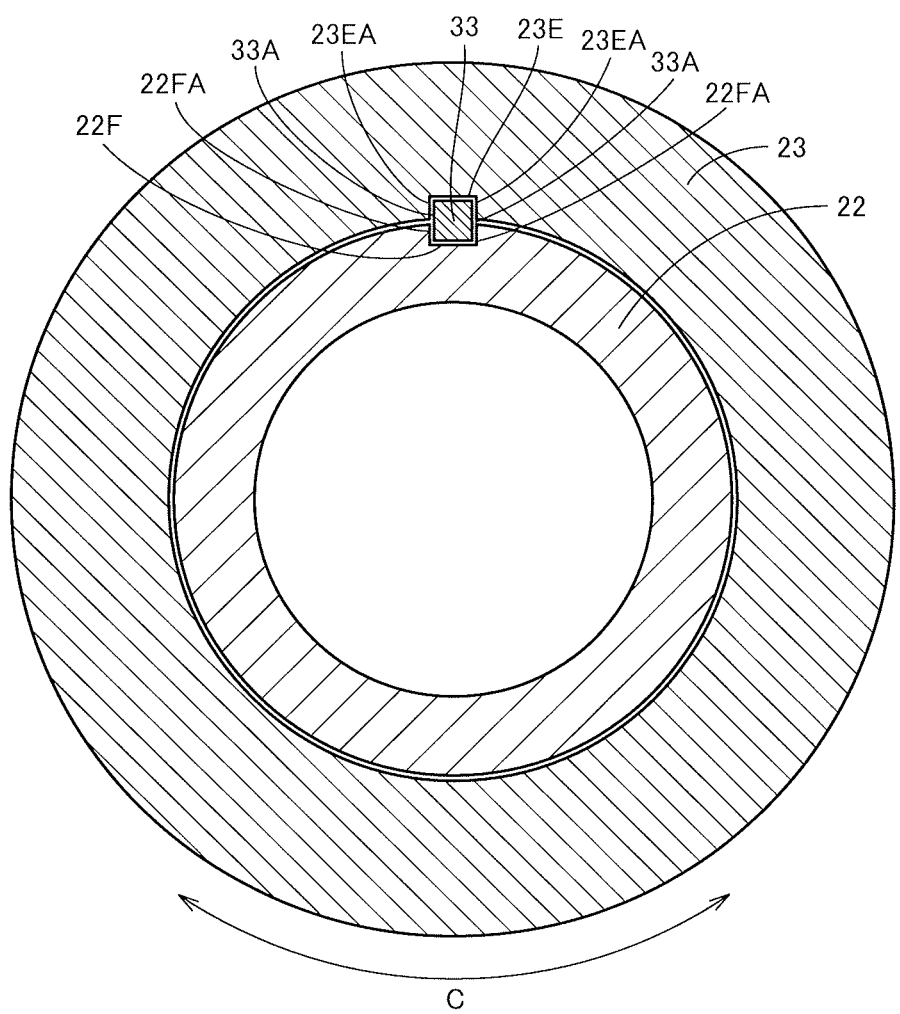
FIG. 11 is a drawing corresponding to a cross section taken along the line XI-XI in FIG. 8 and corresponding to a cross section orthogonal to a rotation axis 21A.

FIG. 8 is a cross-sectional perspective view schematically showing a configuration of a roller device according to a second embodiment of the present invention. FIG. 9 is an enlarged perspective view showing the neighborhood of a key attachment part of a bushing in the roller device shown in FIG. 8. FIG. 10 is a schematic perspective view showing a configuration of a roller shell used for the roller device shown in FIG. 8. FIG. 11 is a drawing corresponding to a cross section taken along the line XI-XI in FIG. 8 and corresponding to a cross section orthogonal to a rotation axis 21A. It is noted that illustration of members on the radially inner side with respect to the bushing is omitted in FIG. 11 for ease of description.

Mainly referring to FIG. 8, the configuration of the roller device of the present embodiment differs from the configuration of the first embodiment shown in FIGS. 3 to 5 in that a key (engaging member) 33 is provided between bushing 22 and roller shell 23.

Specifically, bushing 22 has a recess (first recess) 22F at the outer circumferential surface of smaller-diameter part 22C, for example. Key 33 is inserted into and attached to this recess 22F. In the state attached to recess 22F, key 33 protrudes projectingly to the radially outer side from the outer circumferential surface of smaller-diameter part 22C of bushing 22.

A recess (second recess) 23E is formed at the inner circumferential surface of roller shell 23. Key 33 is inserted in this recess 23E. Key 33 is inserted in both of recess 22F of bushing 22 and recess 23E of roller shell 23.

Mainly referring to FIG. 9, recess 22F of bushing 22 is formed at the outer circumferential surface of smaller-diameter part 22C only partially in a circumferential direction C, rather than entirely in circumferential direction C. By attaching key 33 to this recess 22F, a wall surface of key 33 protruding to the radially outer side from the outer circumferential surface of smaller-diameter part 22C constitutes a stepped portion at the outer circumferential surface of smaller-diameter part 22C. Among the wall surfaces of key 33, particularly a wall surface 33A crossing circumferential direction C forms the stepped portion crossing circumferential direction C.

This recess 22F extends in parallel to the direction in which rotation axis 21A extends, for example. Therefore, the stepped portion formed by wall surface 33A of key 33 is orthogonal to circumferential direction C. It should be noted that recess 22F may not be in parallel to the direction in which rotation axis 21A extends. In this case, the stepped portion formed by wall surface 33A of key 33 is not orthogonal to circumferential direction C, but is in a state crossing circumferential direction C at a predetermined angle.

Mainly referring to FIG. 10, recess 23E provided at the inner circumferential surface of roller shell 23 is positioned on the inner circumferential surface only partially in circumferential direction C, rather than entirely in circumferential direction C. This recess 23E reaches one end face 23F of roller shell 23, and is open at one end face 23F. This one end face 23F is an end face positioned on the central side of bushing 22 along rotation axis 21A in the state where roller shell 23 is attached to bushing 22 as shown in FIG. 8, and is an opposite end face of other end face 23A positioned on the end side of bushing 22.

Since recess 23E reaches one end face 23F of roller shell 23, key 33 can be smoothly inserted into recess 23E through the opening of recess 23E on one end face 23F of roller shell 23 when fitting roller shell 23 over the smaller-diameter part of bushing 22.

Mainly referring to FIG. 11, in the state where roller shell 23 is attached to smaller-diameter part 22C of bushing 22, key 33 is inserted in both of recess 22F of bushing 22 and recess 23E of roller shell 23 as described above. Wall surface 33A of key 33 crossing (e.g., orthogonal to) circumferential direction C is opposed to a wall surface 22FA of recess 22F provided in bushing 22 in circumferential direction C, and is opposed to a wall surface 23EA of recess 23E provided in roller shell 23 in circumferential direction C.

Accordingly, key 33 is configured to be capable of being engaged with both of bushing 22 and roller shell 23 when roller shell 23 is going to rotate in the circumferential direction relative to bushing 22. With key 33 being engaged with both of bushing 22 and roller shell 23, roller shell 23 is prevented from rotating in the circumferential direction relative to bushing 22.

It is noted that, since the configuration of the present embodiment except the above-described points is substantially the same as the configuration of the first embodiment shown in FIGS. 3 to 5, identical elements have identical reference numbers allotted, and description thereof will not be repeated.

As in the roller device of the first embodiment shown in FIGS. 3 to 5, it may not be possible to sufficiently fix roller shell 23 and retainer 24 merely by the repulsive force caused by the elastic deformation of elastic member 25 formed from rubber, for example. In this case, roller shell 23 may rotate in the circumferential direction relative to bushing 22.

In contrast, in the present embodiment, key 33 can be engaged with both of recess 22F of bushing 22 and recess 23E of roller shell 23. Accordingly, roller shell 23 is prevented from rotating in the circumferential direction relative to bushing 22.

It is noted that key 33 has been described above as an engaging member engaged with both of bushing 22 and roller shell 23, however, the engaging member is not limited to this, but may be a knock pin or the like. This knock pin may be inserted in both of recess 22F of bushing 22 and recess 23E of roller shell 23. Alternatively, the engaging member may be anything that can be engaged with both of bushing 22 and roller shell 23 to prevent roller shell 23 from rotating in the circumferential direction relative to bushing 22.

Although the configuration in which recess 23E is formed to reach one end face 23F on the central side of roller shell 23 has been described above as shown in FIG. 8, recess 23E may be formed to reach bottom surface 23Aa on the end side of roller shell 23. In this case, recess 22F of bushing 22, recess 23E of roller shell 23, and engaging member 33 may be arranged at a position on the end side of roller shell 23 as indicated by a region R1 in FIG. 8.

Although the configuration in which engaging member 33 is provided on the outer circumference of smaller-diameter part 22C of bushing 22 has been described above as shown in FIG. 8, engaging member 33 may be arranged on larger-diameter part 22D of bushing 22 as indicated by a region R2 in FIG. 8. In this case, roller shell 23 is also formed to extend to the outer circumference of larger-diameter part 22D.

When engaging member 33 is arranged on larger-diameter part 22D of bushing 22, engaging member 33 between roller shell 23 and bushing 22 on the right side in FIG. 8 and engaging member 33 between roller shell 23 and bushing 22 on the left side in FIG. 8 may be integrated. In this case, engaging member 33 will be positioned in a region indicated as a region R3 in FIG. 8.

Third Embodiment

Figure 12:
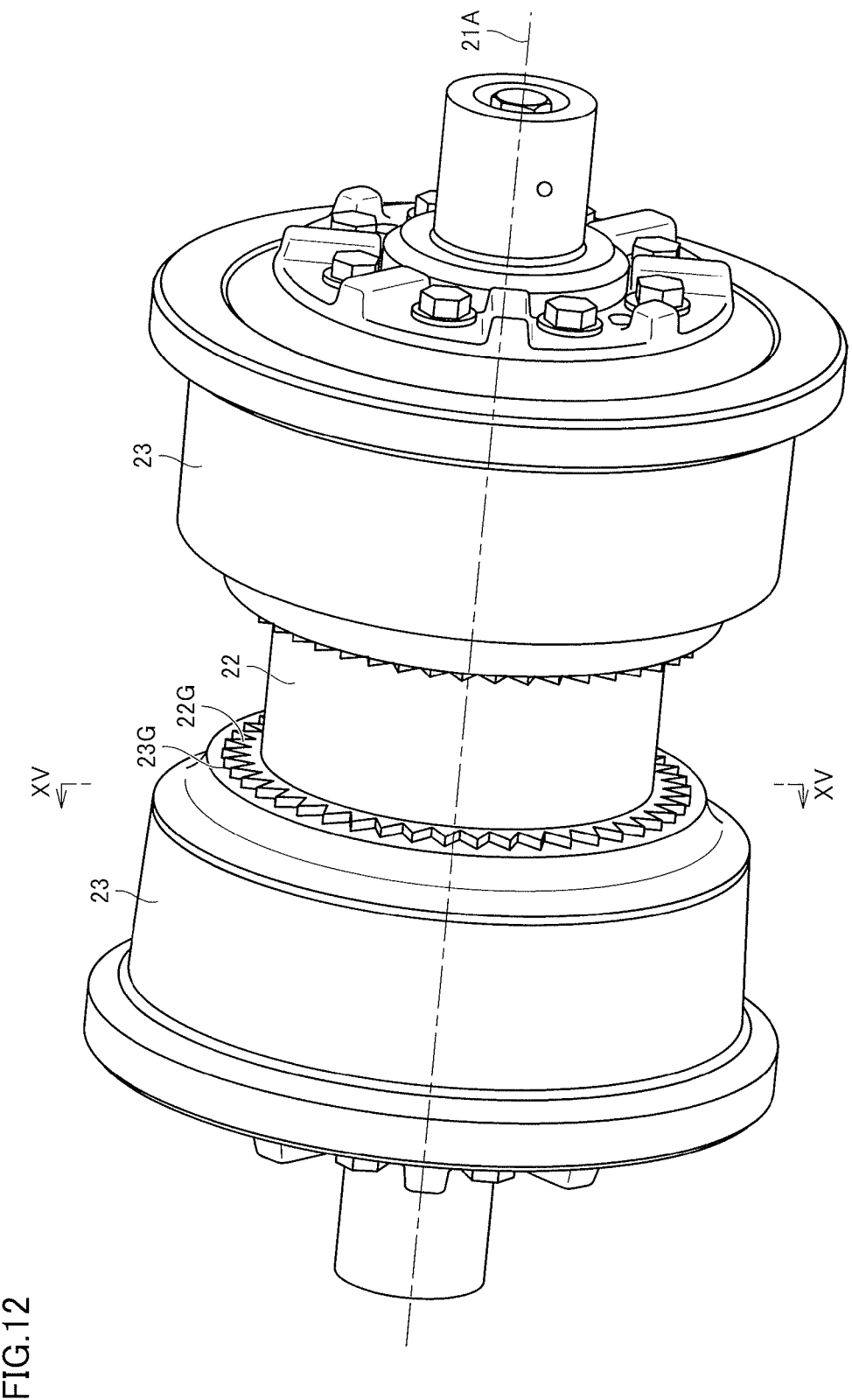
FIG. 12 is a perspective view schematically showing a configuration of a roller device according to a third embodiment of the present invention.
Figure 13:
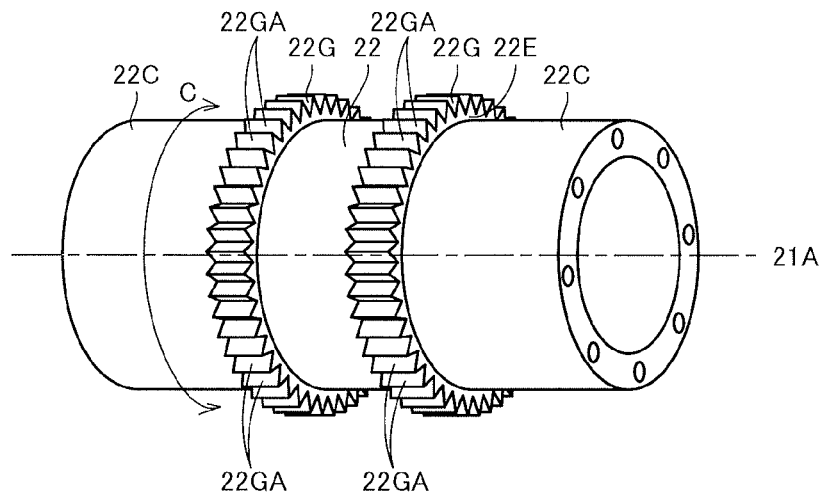
FIG. 13 is a schematic perspective view showing a configuration of a bushing used for the roller device shown in FIG. 12.
Figure 14:
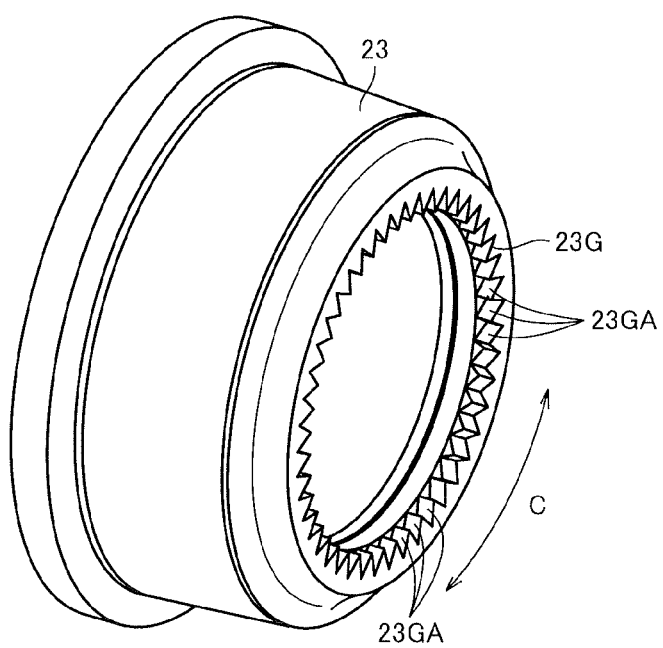
FIG. 14 is a schematic perspective view showing a configuration of a roller shell used for the roller device shown in FIG. 12.
Figure 15:
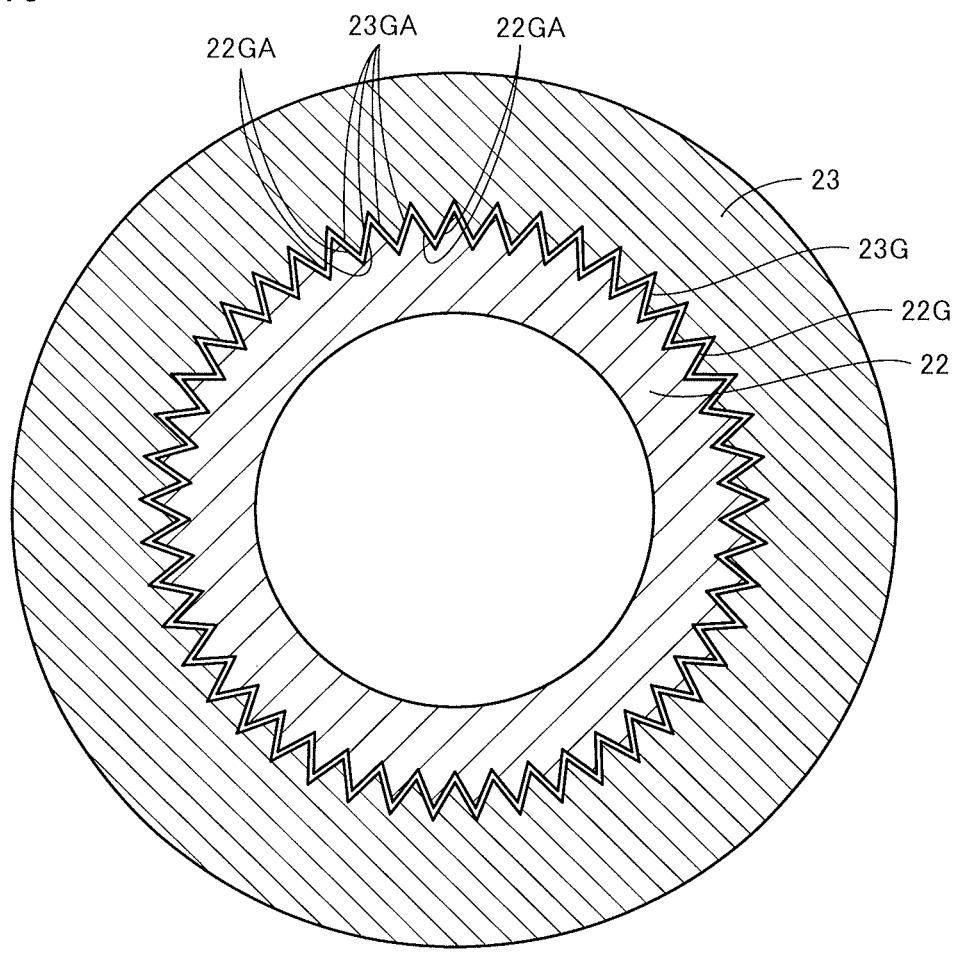
FIG. 15 is a drawing corresponding to a cross section taken along the line XV-XV in FIG. 12 and corresponding to a cross section orthogonal to the rotation axis.

FIG. 12 is a perspective view schematically showing a configuration of a roller device according to a third embodiment of the present invention. FIG. 13 is a schematic perspective view showing a configuration of a bushing used for the roller device shown in FIG. 12. FIG. 14 is a schematic perspective view showing a configuration of a roller shell used for the roller device shown in FIG. 12. FIG. 15 is a drawing corresponding to a cross section taken along the line XV-XV in FIG. 12 and corresponding to a cross section orthogonal to the rotation axis. It is noted that illustration of members on the radially inner side with respect to the bushing is omitted in FIG. 15 for ease of description.

Mainly referring to FIG. 12, the configuration of the roller device of the present embodiment differs from the configuration of the first embodiment shown in FIGS. 3 to 5 in that projecting and recessed serrations are formed at each of the outer circumferential surface of bushing 22 and the inner circumferential surface of roller shell 23.

Specifically, bushing 22 has, on the outer circumferential surface opposed to roller shell 23, projecting and recessed serrations (first tooth section) 22G protruding to the radially outer side. These projecting and recessed serrations 22G constitute projections and recesses at the outer circumferential surface of bushing 22 entirely in the circumferential direction.

Roller shell 23 also has, at the inner circumferential surface opposed to bushing 22, projecting and recessed serrations (second tooth section) 23G protruding to the radially inner side. These projecting and recessed serrations 23G constitute projections and recesses at the inner circumferential surface of roller shell 23 entirely in the circumferential direction.

Projecting and recessed serrations 22G of bushing 22 and projecting and recessed serrations 23G of roller shell 23 are engaged with each other. Projections of projecting and recessed serrations 22G of bushing 22 are fitted within recesses of projecting and recessed serrations 23G of roller shell 23, and projections of projecting and recessed serrations 23G of roller shell 23 are fitted within recesses of projecting and recessed serrations 22G of bushing 22.

Mainly referring to FIG. 13, projecting and recessed serrations 22G have a plurality of wall surfaces 22GA crossing circumferential direction C. Since projecting and recessed serrations 22G are formed over the entire circumference of bushing 22 in circumferential direction C, plurality of wall surfaces 22GA constituting projecting and recessed serrations 22G are arranged over the entire circumference of bushing 22 in circumferential direction C.

Smaller-diameter part 22C of bushing 22 is positioned closer to the end side of bushing 22 than projecting and recessed serrations 22G. A wall surface 22E of projecting and recessed serrations 22G positioned at the boundary between projecting and recessed serrations 22G and smaller-diameter part 22C corresponds to stepped portion 22E according to the first embodiment shown in FIG. 3. Therefore, in the present embodiment, part of the inner circumferential surface of roller shell 23 abuts on wall surface 22E of projecting and recessed serrations 22G in the state where roller shell 23 is attached to bushing 22 although not shown.

Mainly referring to FIG. 14, projecting and recessed serrations 23G has a plurality of wall surfaces 23GA crossing circumferential direction C. Since projecting and recessed serrations 23G are formed over the entire circumference of roller shell 23 in circumferential direction C, plurality of wall surfaces 23GA constituting projecting and recessed serrations 23G are arranged over the entire circumference of roller shell 23 in circumferential direction C.

Mainly referring to FIG. 15, in the state where roller shell 23 is attached to bushing 22, projecting and recessed serrations 22G of bushing 22 and projecting and recessed serrations 23G of roller shell 23 are engaged with each other as described above. Each of plurality of wall surfaces 22GA of projecting and recessed serrations 22G in bushing 22 is opposed to each of plurality of wall surfaces 23GA of projecting and recessed serrations 23G in roller shell 23 in circumferential direction C.

Accordingly, wall surfaces 22GA of projecting and recessed serrations 22G and wall surfaces 23GA of projecting and recessed serrations 23G are configured to abut on and are engaged with each other when roller shell 23 is going to rotate in the circumferential direction relative to bushing 22. With wall surfaces 22GA of projecting and recessed serrations 22G and wall surfaces 23GA of projecting and recessed serrations 23G being engaged with each other, roller shell 23 is prevented from rotating in the circumferential direction relative to bushing 22.

It is noted that, since the configuration of the present embodiment except the above-described points is substantially the same as the configuration of the first embodiment shown in FIGS. 3 to 5, identical elements have identical reference numbers allotted, and description thereof will not be repeated.

In the present embodiment, projecting and recessed serrations 22G of bushing 22 and projecting and recessed serrations 23G of roller shell 23 are engaged with each other. Accordingly, roller shell 23 is prevented from rotating relative to bushing 22.

Although projecting and recessed serrations 22G and 23G have been described above as first and second tooth sections, the first and second tooth sections are not limited to these, but a tooth section of any tooth form selected from among a tooth form in which an involute curve is used, a tooth form in which a cycloid curve is used, and a tooth form in which a trochoid curve is used can be used.

Although the configuration in which projecting and recessed serrations 22G protrude to the radially outer side and projecting and recessed serrations 23G protrude to the inner circumferential side has been described above, projecting and recessed serrations 22G and 23G may each protrude to the rotation axis 21A side. Specifically, in FIG. 13, projecting and recessed serrations 22G in bushing 22 may protrude from stepped portion 22E toward the end side of bushing 22 along rotation axis 21A, and projecting and recessed serrations 23G in roller shell 23 may protrude along rotation axis 21A so as to be engaged with these projecting and recessed serrations 22G.

Although the case in which the first and second tooth sections are formed has been described above, it is only necessary to prevent roller shell 23 from rotating relative to bushing 22 with engagement between stepped portions, without engagement between the tooth sections. Specifically, bushing 22 may have a first stepped portion at the outer circumferential surface opposed to roller shell 23, and roller shell 23 may have a second stepped portion at the inner circumferential surface opposed to bushing 22, and these first and second stepped portions may be opposed to each other in the circumferential direction of the outer circumferential surface.

Fourth Embodiment

Although the above-described first to third embodiments has described the case in which roller shell 23 has a single flange configuration, the roller shell may have a double flange configuration. Hereinafter, a roller device having a roller shell of a double flange configuration will be described below as a fourth embodiment with reference to FIGS. 16 and 17.

Figure 16:
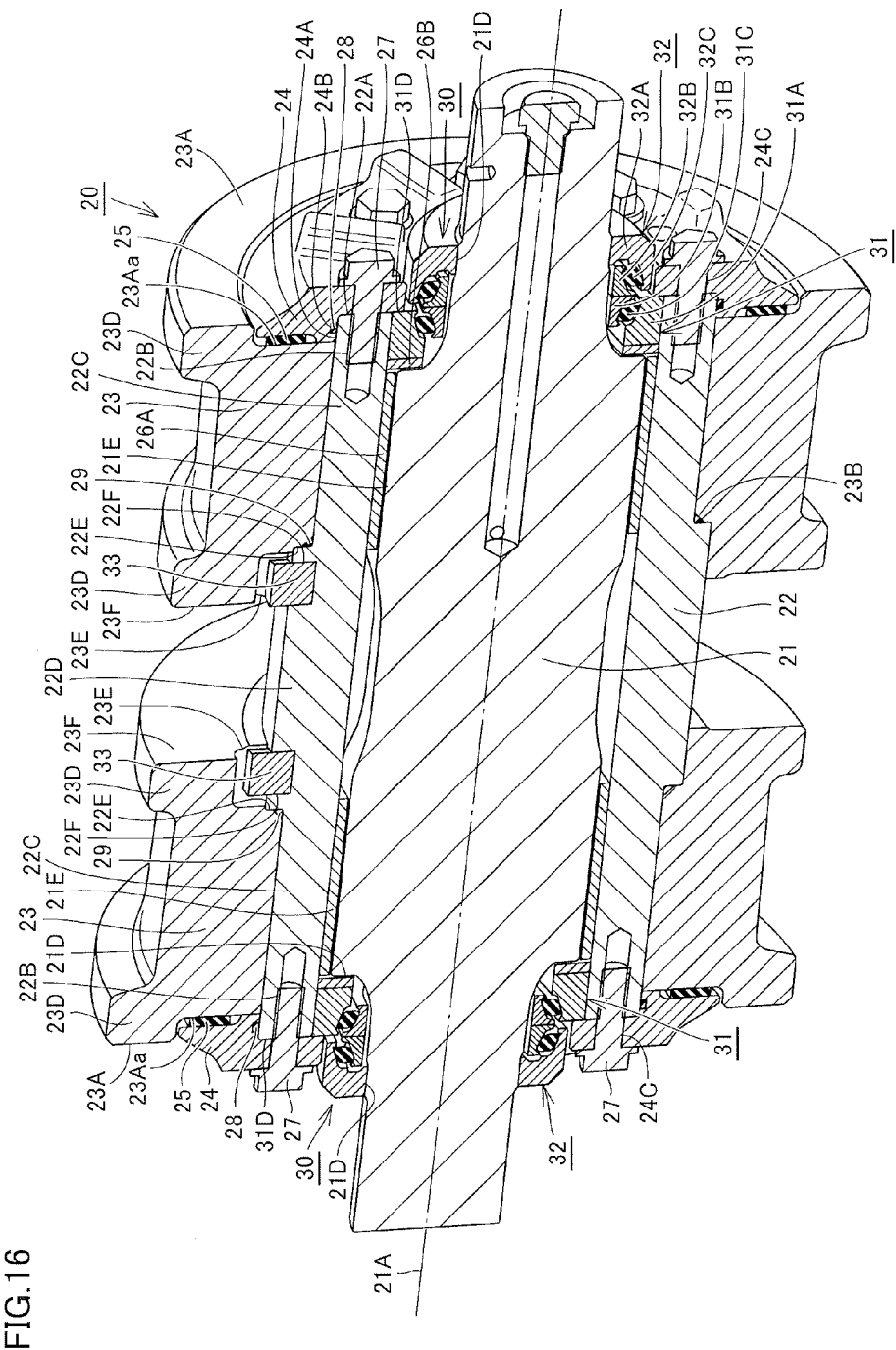
FIG. 16 is a cross-sectional perspective view schematically showing a configuration of a roller device according to a fourth embodiment of the present invention.
Figure 17:
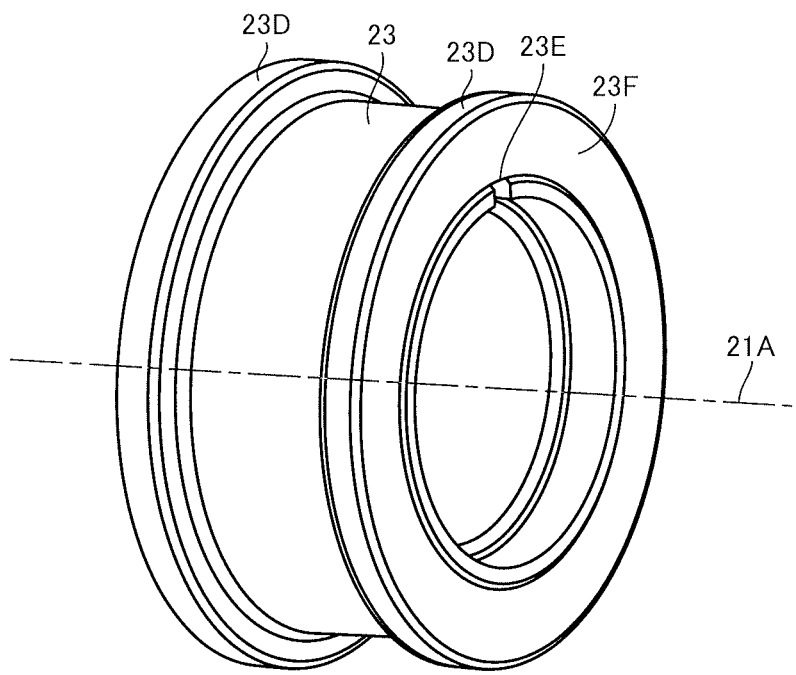
FIG. 17 is a schematic perspective view showing a configuration of a roller shell used for the roller device shown in FIG. 16.

FIG. 16 is a cross-sectional perspective view schematically showing a configuration of the roller device according to the fourth embodiment of the present invention. FIG. 17 is a schematic perspective view showing a configuration of a roller shell used for the roller device shown in FIG. 16.

Referring to FIGS. 16 and 17, the configuration of the roller device of the present embodiment differs from the configuration of the second embodiment shown in FIGS. 8 to 11 in that roller shell 23 has a double flange configuration and in that key 33 is arranged on larger-diameter part 22D of bushing 22.

Mainly referring to FIG. 16, recess (first recess) 22F in which key 33 is to be inserted is formed in larger-diameter part 22D of bushing 22. Key 33 is inserted into and attached to this recess 22F. Key 33 as attached to recess 22F protrudes projectingly to the radially outer side from the outer circumferential surface of larger-diameter part 22D of bushing 22.

Recess (second recess) 23E is formed on the inner circumferential surface of roller shell 23. Key 33 is inserted in this recess 23E. Key 33 is inserted in both of recess 22F of bushing 22 and recess 23E of roller shell 23.

Mainly referring to FIG. 17, roller shell 23 of the double flange configuration has two flanges 23D protruding to the radially outer side. One of two flanges 23D is provided on one end of roller shell 23 along the direction in which rotation axis 21A extends, and the other of two flanges 23D is provided on the other end of roller shell 23 along the direction in which rotation axis 21A extends.

It is noted that, since the configuration of the present embodiment except the above-described points is substantially the same as the configuration of the second embodiment shown in FIGS. 8 to 11, identical elements have identical reference numbers allotted, and description thereof will not be repeated.

In the present embodiment, key 33 can also be engaged with both of recess 22F of bushing 22 and recess 23E of roller shell 23, similarly to the second embodiment shown in FIGS. 8 to 11. Accordingly, roller shell 23 is prevented from rotating in the circumferential direction relative to bushing 22.

Roller shell 23 of the double flange configuration according to the present embodiment is also applicable to the configurations of the above-described first to third embodiments.

It should be understood that the embodiments disclosed herein are illustrative and non-restrictive in every respect. The scope of the present invention is defined by the claims not by the description above, and is intended to include any modification within the meaning and scope equivalent to the terms of the claims.

REFERENCE SIGNS LIST 1 track type carrier;
2 body;
3 blade;
3a upper end;
4 cab;
5 engine compartment;
6 frame;
7 angle cylinder;
8 lift cylinder;
10 track apparatus;
11 track link;
12, 22 bushing;
13 coupling pin;
14 track shoe plate;
15 seal member;
16 bushing hole;
17 pin hole;
20 roller device;
20a carrier roller;
21 shaft;
21A rotation axis;
21B supply channel;
21C plug member;
21D shaft smaller-diameter part;
21E shaft larger-diameter part;
22A, 23A, 23F, 31D end face;
22B attachment hole;
22C bushing smaller-diameter part;
22D bushing larger-diameter part;
22E stepped portion;
22F, 23E recess;
22FA, 22GA, 23EA, 23GA, 33A wall surface;
22G, 23G projecting and recessed serrations;
23 roller shell;
23Aa bottom surface;
23Ab outer circumferential wall surface;
23B tapering part;
23C through-hole;
23D flange;
23U roller shell unit;
24 retainer;
24A inner circumferential surface;
24B groove;
24C insertion hole;
25 elastic member;
25A elastic segment;
26A bearing;
26B thrust bearing;
27 fixing member;
28, 29 O-ring;
30 seal;
31 first seal member;
31A first housing;
31B first floating seal;
31C first elastic ring;
32 second seal member;
32A second housing;
32B second floating seal;
32C second elastic ring;
33 key;
41 driving wheel;
42 idler wheel;
43 track frame;
50 rail surface of track link;
100 bulldozer.

The invention claimed is:

1. A roller device for a track-type work vehicle, comprising:
a shaft having a rotation axis;
a bushing having smaller-diameter parts on both ends and a larger-diameter part arranged between said smaller-diameter parts with stepped portions interposed therebetween, said bushing being fitted over an outer circumference of said shaft to be rotatable relative to said shaft around said rotation axis;
a roller shell having a cylindrical shape and being fitted over the outer circumference of said smaller-diameter parts of said bushing to abut on said stepped portions;
an elastic member; and
a retainer being formed annularly, being fixed detachably to an end face of said bushing, and abutting on an end face of said roller shell with said elastic member interposed therebetween.

2. The roller device for a track-type work vehicle according to claim 1, wherein said roller shell is fitted over the outer circumference of said bushing with a gap left therebetween.

3. The roller device for a track-type work vehicle according to claim 1, further comprising an O-ring arranged between the outer circumference of said bushing and an inner circumference of said retainer.

4. The roller device for a track-type work vehicle according to claim 1, wherein said elastic member has a plurality of elastic segments separately arranged along a circumferential direction of said bushing.

5. The roller device for a track-type work vehicle according to claim 1, wherein said roller shell includes a tapering part on an inner circumferential side of an end face abutting on said stepped portions,
said roller device further comprising an O-ring arranged between said tapering part and said bushing.

6. The roller device for a track-type work vehicle according to claim 1, wherein a length of said roller shell on an inner circumference in a direction along said rotation axis is shorter than a length of said smaller-diameter parts of said bushing in the direction along said rotation axis.

7. The roller device for a track-type work vehicle according to claim 6, wherein said elastic member is formed entirely in a circumferential direction of said bushing.

8. The roller device for a track-type work vehicle according to claim 1, wherein
said bushing has a first recess at an outer circumferential surface opposed to said roller shell, and
said roller shell has a second recess at an inner circumferential surface opposed to said bushing, and
said roller device further comprising an engaging member inserted in both of said first recess and said second recess.

9. The roller device for a track-type work vehicle according to claim 1, wherein
said bushing has a first stepped portion at an outer circumferential surface opposed to said roller shell,
said roller shell has a second stepped portion at an inner circumferential surface opposed to said bushing, and
said first stepped portion and said second stepped portion are opposed to each other in a circumferential direction of said outer circumferential surface.

10. The roller device for a track-type work vehicle according to claim 9, wherein
said bushing has a first tooth section constituting said first stepped portion at said outer circumferential surface,
said roller shell has a second tooth section constituting said second stepped portion at said inner circumferential surface, and
said first tooth section is engaged with said second tooth section.

11. A roller shell unit for a track-type work vehicle, the roller shell unit being attached to a shaft with a bushing interposed therebetween and being fixable to said bushing by a retainer, comprising:
a roller shell having a cylindrical shape having a through-hole extending through from one end face to the other end face, said roller shell including a tapering part provided on the side of said one end face of said through-hole, and including a bottom surface forming a flat surface orthogonal to said through-hole at a position recessed from said other end face to said one end face side; and
an elastic member arranged on said bottom surface of said roller shell.

12. The roller shell unit according to claim 11, wherein said roller shell has a recess partially in the circumferential direction at a circumferential surface of said through-hole.

13. The roller shell unit according to claim 11, wherein said roller shell has a tooth section constituting projections and recesses entirely in the circumferential direction at a circumferential surface of said through-hole.

14. A roller shell for a track-type work vehicle, the roller shell being attached to a shaft with a bushing interposed therebetween and being fixable to said bushing by a retainer,
the roller shell having a cylindrical shape having a through-hole extending through from one end face to the other end face, and having a recess partially in the circumferential direction at a circumferential surface of said through-hole,
the roller shell comprising:
a tapering part provided on the side of said one end face of said through-hole; and
a bottom surface forming a flat surface orthogonal to said through-hole at a position recessed from said other end face to said one end face side.

15. A roller shell for a track-type work vehicle, the roller shell being attached to a shaft with a bushing interposed therebetween and being fixable to said bushing by a retainer,
the roller shell having a cylindrical shape having a through-hole extending through from one end face to the other end face, and having a tooth section constituting projections and recesses entirely in the circumferential direction at a circumferential surface of said through-hole,
the roller shell comprising:
a tapering part provided on the side of said one end face of said through-hole; and
a bottom surface forming a flat surface orthogonal to said through-hole at a position recessed from said other end face to said one end face side.

* * * * *